US011015007B2

(12) United States Patent
Onishi et al.

(10) Patent No.: US 11,015,007 B2
(45) Date of Patent: May 25, 2021

(54) ACTIVE ENERGY RAY-CURABLE COMPOSITION AND CURED PRODUCT THEREOF

(71) Applicant: SHOWA DENKO K.K., Tokyo (JP)

(72) Inventors: Mina Onishi, Tokyo (JP); Tomokazu Sugawara, Tokyo (JP)

(73) Assignee: SHOWA DENKO K.K., Tokyo (JP)

(*) Notice: Subject to any disclaimer, the term of this patent is extended or adjusted under 35 U.S.C. 154(b) by 0 days.

(21) Appl. No.: 16/082,307

(22) PCT Filed: Feb. 2, 2017

(86) PCT No.: PCT/JP2017/003761
§ 371 (c)(1),
(2) Date: Sep. 5, 2018

(87) PCT Pub. No.: WO2017/154428
PCT Pub. Date: Sep. 14, 2017

(65) Prior Publication Data
US 2019/0040175 A1    Feb. 7, 2019

(30) Foreign Application Priority Data

Mar. 7, 2016  (JP) .............................. JP2016-043524

(51) Int. Cl.
| | | |
|---|---|---|
| *C08F 222/10* | (2006.01) | |
| *C08F 220/10* | (2006.01) | |
| *C08F 2/40* | (2006.01) | |
| *C08F 2/46* | (2006.01) | |

(52) U.S. Cl.
CPC .......... *C08F 222/1006* (2013.01); *C08F 2/40* (2013.01); *C08F 2/46* (2013.01); *C08F 220/10* (2013.01); *C08F 222/103* (2020.02); *C08F 222/104* (2020.02); *C08F 2800/20* (2013.01)

(58) Field of Classification Search
CPC ............ C08F 222/1006; C08F 222/103; C08F 222/104; C08F 220/10; C08F 2/40; C08F 2/46; C08F 2800/20
See application file for complete search history.

(56) References Cited

U.S. PATENT DOCUMENTS

| | | | |
|---|---|---|---|
| 3,855,093 A | 12/1974 | Guthrie et al. | |
| 4,048,218 A * | 9/1977 | Morgan ................ | C07C 323/00 560/147 |
| 5,876,805 A | 3/1999 | Ostlie | |
| 6,455,207 B1 | 9/2002 | Katoh et al. | |
| 7,888,399 B2 | 2/2011 | Miyata et al. | |
| 8,053,167 B2 | 11/2011 | Murofushi et al. | |
| 9,376,603 B2 * | 6/2016 | Okazaki .................. | C09J 4/00 |
| 10,328,603 B2 * | 6/2019 | Fong ...................... | B33Y 10/00 |
| 2005/0153231 A1 | 7/2005 | Katoh et al. | |
| 2007/0083012 A1 | 4/2007 | Kamijo et al. | |
| 2009/0023831 A1 | 1/2009 | Miyata et al. | |
| 2010/0029876 A1 | 2/2010 | Miyata et al. | |
| 2010/0047713 A1 | 2/2010 | Murofushi | |
| 2010/0210812 A1 | 8/2010 | Urakawa et al. | |
| 2015/0252234 A1 * | 9/2015 | Okazaki .................... | C09J 4/00 524/710 |

FOREIGN PATENT DOCUMENTS

| | | |
|---|---|---|
| CN | 104736603 A | 6/2015 |
| EP | 1983017 A1 | 10/2008 |
| EP | 2088163 A1 | 8/2009 |
| EP | 2 878 613 A1 | 6/2015 |
| JP | 2000-508685 A | 7/2000 |
| JP | 2004-035734 A | 2/2004 |
| JP | 2005-163033 A | 6/2005 |
| JP | 2008-063454 A | 3/2008 |
| JP | 2011-032202 A | 2/2011 |
| JP | 2011-032351 A | 2/2011 |
| JP | 4902608 B2 | 3/2012 |
| WO | 2007/145241 A1 | 12/2007 |

(Continued)

OTHER PUBLICATIONS

Notification of Transmittal of Translation of the International Preliminary Report on Patentability, dated Sep. 20, 2018 from the International Bureau in counterpart International application No. PCT/JP2017/003761.
International Preliminary Report on Patentability and Translation of Written Opinion, dated Sep. 11, 2018 from the International Bureau in counterpart International application No. PCT/JP2017/003761.
Communication dated Mar. 27, 2019, from the European Patent Office in the counterpart application No. 17762773.4.
Charles E. Hoyle et al., "Thiol-Enes: Chemistry of the Past with Promise for the Future", Highlight, Journal Polymer Science Part A: Polymer Chemistry, 2004, pp. 5301-5338, vol. 42.
C.E. Hoyle et al., "Laser-initiated Polymerization of a Thiol-Ene System", Polymer Photochemistry, 1984, pp. 69-80, vol. 4.
International Search Report for PCT/JP2017/003761 dated Feb. 28, 2017 [PCT/ISA/210].

Primary Examiner — Sanza L. McClendon
(74) Attorney, Agent, or Firm — Sughrue Mion, PLLC

(57) ABSTRACT

There is provided an active energy ray-curable composition having excellent storage stability. The active energy ray-curable composition includes: active energy ray-curable compound (A) having an unsaturated ethylenic double bond; thiol compound (B) having two or more mercapto groups in one molecule; reaction inhibitor (C) configured to inhibit a reaction between the unsaturated ethylenic double bond and the mercapto groups; radical polymerization inhibitor (D); and water (E), wherein the content of water (E) is 0.05 ppm by mass or more and less than 1% by mass. When the total content of active energy ray-curable compound (A) and thiol compound (B) is 100 parts by mass, the content of reaction inhibitor (C) is 0.005 parts by mass or more and 10 parts by mass or less, and the content of radical polymerization inhibitor (D) is 0.005 parts by mass or more and 5 parts by mass or less.

14 Claims, No Drawings

(56) References Cited

FOREIGN PATENT DOCUMENTS

WO 2009/011211 A1 1/2009
WO 2012/126695 A1 9/2012

* cited by examiner

ACTIVE ENERGY RAY-CURABLE COMPOSITION AND CURED PRODUCT THEREOF

CROSS REFERENCE TO RELATED APPLICATIONS

This application is a National Stage of International Application No. PCT/JP2017/003761 filed Feb. 2, 2017, claiming priority based on Japanese Patent Application No. 2016-43524 filed Mar. 7, 2016.

TECHNICAL FIELD

The present invention relates to an active energy ray-curable composition and a cured product of the active energy ray-curable composition.

BACKGROUND ART

A copolymerization reaction (hereinafter referred to as "enethiol reactions") and a copolymer between a compound having an ethylene carbon-carbon double bond (hereinafter referred to as "enic compound") and a thiol compound are useful technologies well known in the field of photosensitive compositions, and have features of having a high curing rate, enabling improvement in productivity, and having a small cure shrinkage because of not being affected very much by inhibition of polymerization due to oxygen in air. Therefore, such reactions and copolymers have been used in: applications as fast cure resins such as coat materials, sealants, sealing materials, and adhesives; applications as molded articles; and the like.

However, since an enethiol reaction proceeds due to light or heat even in the absence of a polymerization initiator, it is difficult to allow a composition containing an enic compound and a thiol compound to be a one-component type. The stabilization of the enethiol reaction has been examined for a while. NPL 1 presents addition of common radical polymerization inhibitors, phosphoric acid, hindered phenols, and thermal stabilizers including pyrogallol and catechol, but describes that the addition may be completely ineffective depending on the kind of an enic compound. Thus, the addition has not attained a practical technology level.

PTL 1 discloses a photosensitive composition containing a thiol compound having substituents on carbon atoms at α-position and/or β-position with respect to a mercapto group as well as a compound having an ethylenically unsaturated bond. However, the photosensitive composition has had a problem of having insufficient storage stability at high temperature.

PTL 2 and NPL 2 disclose a technology of adding phosphonic acid as a stabilizer to a composition containing an enic compound and a thiol compound. However, phosphonic acid has low solubility in a thiol compound and an enic compound. Therefore, it has been difficult to homogeneously dissolve phosphonic acid throughout the composition. Therefore, there has been a problem that the storage stability of the composition containing an enic compound and a thiol compound is insufficient.

PTL 3 presents a pressure sensitive adhesive composition improved in storage stability by adding an inorganic or organic phosphorous compound and an N-nitroso compound to a composition in which an enethiol reaction proceeds.

However, the pressure sensitive adhesive composition may have become unstable depending on an environment.

CITATION LIST

Patent Literature

PTL 1: Japanese Patent Publication No. 4902608
PTL 2: U.S. Pat. No. 3,855,093
PTL 3: JP 2004-35734 A

Non Patent Literature

NPL 1: Journal Polymer Science Part A: Polymer Chemistry, Vol. 42, 5301-5338
NPL 2: C. E. Hoyle, R. D. Hensel and M. B. Grubb, "Laser-initiated Polymerization of a Thiol-Ene System", Polymer Photochemistry, 4 (1984), p. 69-80

SUMMARY OF INVENTION

Technical Problem

Thus, an object of the present invention is to solve the problems of such conventional technologies as described above and to provide an active energy ray-curable composition having excellent storage stability and a cured product of the active energy ray-curable composition.

Solution to Problem

To solve the problems, one aspect of the present invention is described in the following [1] to [10]:

[1] An active energy ray-curable composition including: an active energy ray-curable compound (A) having an unsaturated ethylenic double bond; a thiol compound (B) having two or more mercapto groups in one molecule; a reaction inhibitor (C) configured to inhibit a reaction between the unsaturated ethylenic double bond of the active energy ray-curable compound (A) and the mercapto groups of the thiol compound (B); a radical polymerization inhibitor (D); and water (E), wherein the content of the water (E) is 0.05 ppm by mass or more and less than 1% by mass;

the content of the reaction inhibitor (C) is 0.005 parts by mass or more and 10 parts by mass or less when the total content of the active energy ray-curable compound (A) and the thiol compound (B) is 100 parts by mass; and the content of the radical polymerization inhibitor (D) is 0.005 parts by mass or more and 5 parts by mass or less when the total content of the active energy ray-curable compound (A) and the thiol compound (B) is 100 parts by mass.

[2] The active energy ray-curable composition according to [1], wherein the reaction inhibitor (C) includes a compound having a pKa value of less than 5.

[3] The active energy ray-curable composition according to [1] or [2], wherein the thiol compound (B) includes a compound having two or more mercapto groups in one molecule, all the mercapto groups being bound to a secondary carbon atom or a tertiary carbon atom.

[4] The active energy ray-curable composition according to any one of [1] to [3], wherein the thiol compound (B) includes a compound having a group represented by the following Formula (1), the group being bound to a carbon atom, wherein in the following Formula (1), $R^1$ represents an alkyl group having 1 or more and 10 or less carbon atoms, $R^2$ represents a hydrogen atom or an alkyl group having 1 or more and 10 or less carbon atoms, and m represents an integer 0 or more and 2 or less.

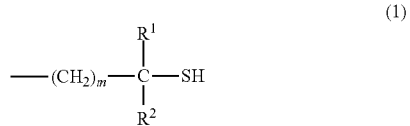

(1)

[5] The active energy ray-curable composition according to any one of [1] to [3], wherein the thiol compound (B) includes at least one selected from 1,4-bis(3-mercaptobutyryloxy) butane, pentaerythritol tetrakis(3-mercaptobutylate), 1,3,5-tris(3-mercaptobutyloxyethyl)-1,3,5-triazine-2,4,6(1H,3H,5H)-trione, and trimethylolpropane tris(3-mercaptobutylate).

[6] The active energy ray-curable composition according to any one of [1] to [5], wherein the reaction inhibitor (C) includes at least one selected from carboxy group-containing compound, phosphate group-containing compound, phosphoric acid, phosphorous acid, and alkoxide compound.

[7] The active energy ray-curable composition according to any one of [1] to [5], wherein the reaction inhibitor (C) includes at least one selected from heptanoic acid, (meth)acrylic acid, (meth)acryloyloxyethyl succinic acid, (meth)acryloyloxyethyl hexahydrophthalic acid, (meth)acryloyloxyethyl phthalic acid, (2-methacryloyloxy)ethyl dihydrogen phosphate, bis[2-(methacryloyloxy)ethyl]hydrogen phosphate, triethoxyborane, and tetraethoxysilane.

[8] The active energy ray-curable composition according to any one of [1] to [7], wherein the radical polymerization inhibitor (D) includes a compound having a benzene ring and/or a naphthalene ring to which one or more hydroxy groups are bound.

[9] The active energy ray-curable composition according to any one of [1] to [7], wherein the radical polymerization inhibitor (D) includes at least one selected from 1,2,3-trihydroxybenzene and propyl-3,4,5-trihydroxybenzene.

[10] A cured product of the active energy ray-curable composition according to any one of [1] to [9].

Advantageous Effects of Invention

According to the present invention, there can be provided: an active energy ray-curable composition having excellent storage stability; and a cured product of the active energy ray-curable composition.

DESCRIPTION OF EMBODIMENTS

The present inventors focused on the point that when water is contained in a system, particularly in the case of a thiol compound having an ester backbone, hydrolysis may be caused over time, a generated mercapto group-containing carboxylic acid may function as a chain transfer agent, the polymerization or addition reaction of an unsaturated bond may be allowed to proceed, and the presence of water greatly contributes to enethiol reaction. As a result of intensive examination for solving the problems of the conventional technologies described above, the present inventors found that the problems can be solved by using a reaction inhibitor and a radical polymerization inhibitor under particular hydrous conditions, and the present invention was thus accomplished.

In other words, an active energy ray-curable composition of the present invention contains: an active energy ray-curable compound (A) having an unsaturated ethylenic double bond (hereinafter may be simply referred to as "active energy ray-curable compound (A)"; a thiol compound (B) having two or more mercapto groups in one molecule; a reaction inhibitor (C) configured to inhibit a reaction between the unsaturated ethylenic double bond of the active energy ray-curable compound (A) and the mercapto groups of the thiol compound (B); a radical polymerization inhibitor (D); and water (E).

Examples of such active energy rays include ultraviolet rays, infrared rays, visible rays, electron rays, α-rays, γ-rays, and X-rays.

In the present invention, curability means at least one of polymerizability and crosslinkability.

The content of the water (E) in the active energy ray-curable composition is 0.05 ppm by mass or more and less than 1% by mass with respect to the total composition. In addition, when the total content of the active energy ray-curable compound (A) and the thiol compound (B) is 100 parts by mass, the content of the reaction inhibitor (C) is 0.005 parts by mass or more and 10 parts by mass or less. Further, when the total content of the active energy ray-curable compound (A) and the thiol compound (B) is 100 parts by mass, the content of the radical polymerization inhibitor (D) is 0.005 parts by mass or more and 5 parts by mass or less.

The active energy ray-curable composition of the present invention has excellent storage stability and an appropriate work life because of containing the reaction inhibitor (C) and the radical polymerization inhibitor (D) under the particular hydrous conditions although being highly sensitive to active energy ray curability. Therefore, the active energy ray-curable composition is enabled to be a one-component type, and the workability of working using the active energy ray-curable composition is favorable. Therefore, the active energy ray-curable composition of the present invention can be used in various industrial fields. For example, the active energy ray-curable composition of the present invention and a cured product of the active energy ray-curable composition can be applied to applications in various industrial fields, such as applications as fast cure resins such as coatings, adhesives, resists, coat materials, sealants, and sealing materials, and applications as molded articles such as optical components. More specifically, the active energy ray-curable composition and the cured product can be applied to printing plates, collar proofs, color filters, solder resists, photo-curing inks, photo fabrication products, compositions for 3D printers, and the like.

An active energy ray-curable composition according to one embodiment of the present invention and a cured product obtained by irradiating the active energy ray-curable composition with an active energy ray and curing the active energy ray-curable composition will be described in detail below.

[1] Active Energy Ray-Curable Compound (A) Having Unsaturated Ethylenic Double Bond The kind of the active energy ray-curable compound (A) having an unsaturated ethylenic double bond is not particularly limited as long as having the property of reacting and being cured due to irradiation with an active energy ray, and examples thereof include a compound which can be cured by radical polymerization (or crosslinking) reaction, and a compound commonly referred to as a monomer and an oligomer.

Specific examples thereof include (meth)acrylic acid, (meth)acrylates (for example, methyl (meth)acrylate, butyl (meth)acrylate, benzyl (meth)acrylate, 2-hydroxyethyl (meth)acrylate, and 2-hydroxypropyl (meth)acrylate), ethylene glycol di(meth)acrylate, pentaerythritol tri(meth)acrylate, styrene, divinylbenzene, (meth)acrylamides, vinyl acetate, N-hydroxymethyl (meth)acrylamide, dipentaerythritol hexa(meth)acrylate, melamine (meth)acrylate, (meth)acrylic copolymers, an adduct of a compound having plural epoxy groups and (meth)acrylic acid, urethane (meth)acrylate prepolymers, diallyl phthalate, triallyl isocyanurate, allyl (meth)acrylate (co) polymers, an adduct obtained by subjecting a (co) polymer such as (meth)acrylic acid or maleic acid to addition reaction with glycidyl (meth)acrylate or allyl glycidyl ether, and an unsaturated polyester obtained by polycondensation reaction of maleic acid and a diol. These compounds may be used singly, or in combination of two or more kinds thereof.

The active energy ray-curable compound (A) is preferably a compound having two or more ethylenically unsaturated bonds, in view of exposure sensitivity and various resistances after curing.

Herein, "(meth)acrylate" means at least any one selected from methacrylate and acrylate, and "(meth)acryl" means at least one selected from methacryl and acryl.

[2] Thiol Compound (B) Having Two or More Mercapto Groups in One Molecule

The thiol compound (B) having two or more mercapto groups in one molecule is preferably a compound having two or more and six or less mercapto groups in the molecule. Examples thereof include aliphatic polythiols such as alkanedithiols having around 2 or more and 20 or less carbon atoms, aromatic polythiols such as xylylenedithiols, a polythiol formed by substituting a halogen atom of a halohydrin adduct of an alcohol with a thiol group, and a polythiol including a hydrogen sulfide reaction product of a polyepoxide compound. A polythiol including an ester compound of a polyvalent alcohol having two or more and six or less hydroxy groups in the molecule and a thiocarboxylic acid such as thioglycollic acid, β-mercaptopropionic acid, or β-mercaptobutanoic acid (hereinafter referred to as "polythiol including ester compound") is preferred from the viewpoint of storage stability and curability because, when the polythiol is used as an active energy ray-curable composition, the polythiol can be cured even at a low illumination level, and the thickening of the composition can be inhibited.

A compound which has two or more mercapto groups in one molecule and in which all the mercapto groups are bound to secondary or tertiary carbon atoms is particularly preferred as the thiol compound (B). In other words, the thiol compound (B) has a mercapto group-containing group in which substituents are bound to carbon atoms at the α-positions with respect to mercapto groups and has two or more mercapto groups. At least one of the substituents is preferably an alkyl group.

The binding of substituents to carbon atoms at the α-positions with respect to mercapto groups means that the carbon atoms at the α-positions of the mercapto groups are bound to two or three carbon atoms. The fact that at least one of the substituents is an alkyl group means that at least one of the other groups than main chains among the groups bound to the carbon atoms at the α-positions with respect to mercapto groups is an alkyl group. Here, such a main chain refers to the structural site having the longest chain among the other structural sites than a mercapto group and a hydrogen atom, bound to a carbon atom at an α-position.

The mercapto group-containing group is preferably a group represented by the following Formula (1). In the thiol compound (B), the mercapto group-containing group is bound to a carbon atom. In the following Formula (1), $R^1$ represents an alkyl group having 1 or more and 10 or less carbon atoms, and $R^2$ represents a hydrogen atom or an alkyl group having 1 or more and 10 or less carbon atoms. In addition, m in the following Formula (1) represents an integer 0 or more and 2 or less, preferably 0 or 1.

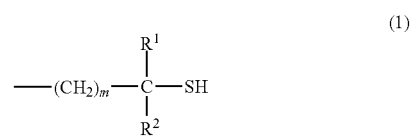

(1)

The alkyl groups having 1 or more and 10 or less carbon atoms, represented by $R^1$ and $R^2$, may be straight-chain or branched-chain. Examples thereof include methyl group, ethyl group, n-propyl group, iso-propyl group, n-butyl group, iso-butyl group, tert-butyl group, n-hexyl group, and n-octyl group, preferably methyl group or ethyl group.

The thiol compound (B) is not particularly limited as long as being a compound which has two or more mercapto groups and in which all the mercapto groups are bound to secondary or tertiary carbon atoms. The thiol compound (B) is preferably a polyfunctional thiol compound having two or more mercapto group-containing groups represented by Formula (1).

By allowing the thiol compound (B) to be polyfunctional as described above, sensitivity to active energy ray curability can be enhanced in comparison with a monofunctional compound.

In addition, the mercapto group-containing group is more preferably a group having a carboxylic acid derivative structure represented by the following Formula (2).

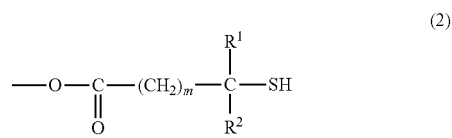

(2)

Further, the thiol compound (B) is preferably an ester of a mercapto group-containing carboxylic acid represented by the following Formula (3) and an alcohol.

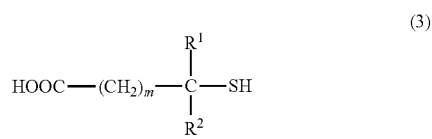

(3)

The definitions of $R^1$, $R^2$, and m in the Formulae (2) and (3) described above are similar to the definitions of $R^1$, $R^2$, and m in the Formula (1).

The alcohol esterified with the mercapto group-containing carboxylic acid represented by the Formula (3) described above is preferably a polyvalent alcohol. The compound obtained by the esterification reaction can be allowed to be a polyfunctional thiol compound by using the polyvalent alcohol.

Examples of the polyvalent alcohol include alkylene glycols (of which the number of the carbon atoms of the alkylene group is preferably two or more and ten or less, and the carbon chain may be a straight chain or a branched chain), diethylene glycol, glycerin, dipropylene glycol, trimethylol propane, pentaerythritol, dipentaerythritol, and tris(2-hydroxyethyl)isocyanurate. Examples of the alkylene glycols include ethylene glycol, trimethylene glycol, 1,2-propylene glycol, 1,2-butanediol, 1,3-butanediol, 2,3-butanediol, and tetramethylene glycol.

Among them, trimethylol propane, pentaerythritol, and tris(2-hydroxyethyl)isocyanurate are preferred from the viewpoint of availability, the number of functional groups, and vapor pressure.

Examples of the mercapto group-containing carboxylic acid of the Formula (3) described above include 2-mercaptopropionic acid, 3-mercaptopropionic acid, 2-mercaptobutanoic acid, 3-mercaptobutanoic acid, 4-mercaptobutanoic acid, 2-mercaptoisobutanoic acid, 2-mercaptoisopentanoic acid, 3-mercaptoisopentanoic acid, and 3-mercaptoisohexanoic acid.

Specific examples of the compound which has two or more mercapto group-containing groups of the Formula (1) described above and in which all the mercapto groups are bound to secondary or tertiary carbon atoms include compounds described below.

Examples of hydrocarbon dithiols include 2,5-hexanedithiol, 2,9-decanedithiol, and 1,4-bis(1-mercaptoethyl)benzene.

Examples of the compound including the ester bond structure include phthalic acid di(1-mercaptoethyl ester), phthalic acid di(2-mercaptopropyl ester), phthalic acid di(3-mercaptobutyl ester), ethylene glycol bis(3-mercaptobutylate), propylene glycol bis(3-mercaptobutylate), diethylene glycol bis(3-mercaptobutylate), butanediol bis(3-mercaptobutylate), octanediol bis(3-mercaptobutylate), trimethylol propane tris(3-mercaptobutylate), pentaerythritol tetrakis(3-mercaptobutylate), dipentaerythritol hexakis(3-mercaptobutylate), ethylene glycol bis(2-mercaptopropionate), propylene glycol bis(2-mercaptopropionate), diethylene glycol bis(2-mercaptopropionate), butanediol bis(2-mercaptopropionate), octanediol bis(2-mercaptopropionate), trimethylol propane tris(2-mercaptopropionate), pentaerythritol tetrakis(2-mercaptopropionate), dipentaerythritol hexakis(2-mercaptopropionate), ethylene glycol bis(4-mercaptovalerate), propylene glycol bis(4-mercaptoisovalerate), diethylene glycol bis(4-mercaptovalerate), butanediol bis(4-mercaptovalerate), octanediol bis(4-mercaptovalerate), trimethylol propane tris(4-mercaptovalerate), pentaerythritol tetrakis(4-mercaptovalerate), dipentaerythritol hexakis(4-mercaptovalerate), ethylene glycol bis(3-mercaptovalerate), propylene glycol bis(3-mercaptovalerate), diethylene glycol bis(3-mercaptovalerate), butanediol bis(3-mercaptovalerate), octanediol bis(3-mercaptovalerate), trimethylol propane tris(3-mercaptovalerate), pentaerythritol tetrakis(3-mercaptovalerate), dipentaerythritol hexakis (3-mercaptovalerate), 1,4-bis(3-mercaptobutyryloxy) butane, and 1,3,5-tris(3-mercaptobutyloxyethyl)-1,3,5-triazine-2,4,6 (1H,3H,5H)-trione.

Examples of commercially available products of secondary thiols of which each contains two or more mercapto groups in the molecule include 1,4-bis(3-mercaptobutyryloxy) butane (trade name: Karenz MT (trademark) BD1, manufactured by Showa Denko K.K.), a mixture product of pentaerythritol tetrakis(3-mercaptobutylate) and pentaerythritol tris(3-mercaptobutylate) (trade name: Karenz MT (trademark) PE1, manufactured by Showa Denko K.K.), 1,3,5-tris(3-mercaptobutyloxyethyl)-1,3,5-triazine-2,4,6 (1H,3H,5H)-trione (trade name: Karenz MT (trademark) NR1, manufactured by in Showa Denko K.K.), and trimethylol propane tris(3-mercaptobutylate) (trade name: TPMB, manufactured by Showa Denko K.K.).

Such thiol compound (B) may be used singly, or in combination of two or more kinds thereof. The weight average molecular weight of such a thiol compound (B) is not particularly limited, but is preferably 200 or more and 1,000 or less from the viewpoint of the easiness of the preparation of the active energy ray-curable composition of the present embodiment. The weight average molecular weight is a weight average molecular weight, in terms of polystyrene, measured by gel permeation chromatography.

To examination the radical polymerization or ionic polymerization of a thiol compound in which substituents other than hydrogen are at the α- and/or β-positions with respect to a mercapto group, each of the activation energies (at 298 K and a pressure of one atmosphere) of a primary thiol structure in which hydrogen is at the α-position and a secondary thiol structure in which a methyl group is at the α-position was calculated. In both of the radical polymerization and the ionic polymerization, the activation energies of the secondary thiol structure were 3 kcal/mol higher. Thus, the secondary thiol structure is superior in storage stability in the case of the active energy ray-curable composition. In the active energy ray-curable composition, curability is higher in a case in which the blended thiol compound (B) is a polyfunctional thiol compound than in a case in which the blended thiol compound (B) is a monofunctional thiol compound, and therefore, the polyfunctional thiol compound is more advantageous in the shortening of a curing time, the enhancement of a molecular weight, and the like.

The preferred content of the thiol compound (B) in the active energy ray-curable composition can be expressed by the ratio between the number of the unsaturated ethylenic double bonds of the active energy ray-curable compound (A) and the number of the mercapto groups of the thiol compound (B). In other words, the ratio of the number of the mercapto groups of the thiol compound (B) to the number of the unsaturated ethylenic double bonds of the active energy ray-curable compound (A) is preferably 0.01 or more and 3.0 or less, and more preferably 0.2 or more and 2.0 or less.

A thiol compound has a high effect as a chain transfer agent and therefore allows the radical polymerization of an unsaturated ethylenic double bond to proceed. Therefore, the number of the mercapto groups of the thiol compound (B) is not necessarily the same as the number of the unsaturated ethylenic double bonds of the active energy ray-curable compound (A). When the ratio of the mercapto groups of the thiol compound (B) to the number of the unsaturated ethylenic double bonds of the active energy ray-curable compound (A) is 0.01 or more, the influence of oxygen inhibition is reduced, and curability expected in enethiol reaction can be exhibited. When the ratio of the mercapto groups of the thiol compound (B) to the number of the unsaturated ethylenic double bonds of the active energy ray-curable compound (A) is 3.0 or less, the number of unreacted mercapto groups is small, and therefore, tackiness is reduced, thereby reducing concerns about the staining of a periphery in the case of using the active energy ray-curable composition.

[3] Reaction Inhibitor (C) Inhibiting Reaction Between Unsaturated Ethylenic Double Bond of Active Energy Ray-Curable Compound (A) and Mercapto Group of Thiol Compound (B)

The active energy ray-curable composition of the present embodiment is an enethiol reaction composition and is therefore required to inhibit not only the radical polymerization of the unsaturated ethylenic double bond of the active energy ray-curable compound (A) but also the addition reaction of the mercapto groups of the thiol compound (B) to the unsaturated ethylenic double bond of the active energy ray-curable compound (A).

From the viewpoint of inhibiting the addition reaction between the unsaturated ethylenic double bond of the active energy ray-curable compound (A) and the mercapto groups of the thiol compound (B), the reaction inhibitor (C) is preferably a compound having a low pKa value or a compound trapping a proton before the mercapto groups of the thiol compound (B) are activated to donate the proton to the unsaturated ethylenic double bond of the active energy ray-curable compound (A). Examples of such compounds include acids, phosphate group-containing compounds, and alkoxide compounds.

Examples of acids having a pKa value of less than 5 among such compounds having a low pKa value include phosphoric acid, phosphorous acid, and principally carboxy group-containing compounds, of which examples include acetic acid, formic acid, propionic acid, glycolic acid, lactic acid, benzoic acid, oxalic acid, malonic acid, succinic acid, glutaric acid, malic acid, tartaric acid, butyric acid, isobutyric acid, benzoic acid, valeric acid, isovaleric acid, pivalic acid, citric acid, dimer acid, and heptanoic acid. From the viewpoint of handleability including odors, phosphoric acid, phosphorous acid, malonic acid, dimer acid, and heptanoic acid are preferred. Further, from the viewpoint of solubility and tints, phosphoric acid, phosphorous acid, malonic acid, and heptanoic acid are preferred.

The pKa value is measured in such a manner as described below. In other words, pKa is pKa=−log Ka and is obtained from an acid dissociation constant Ka=[$H_3O^+$][$B^-$]/[BH] under dilute aqueous solution conditions. Here, BH represents an acid, and $B^-$ represents the conjugate base of an acid. In a case in which there are two or more acidic groups, a first dissociation constant pKa1 is regarded as an acid dissociation constant. In a method for measuring pKa, for example, the concentration of hydrogen ions is measured by using a pH meter, and pKa can be calculated from the concentration of an applicable substance and the concentration of the hydrogen ions.

A compound which is an acid and has an unsaturated ethylenic double bond is preferred because of being able to be incorporated into a curing system in the case of active energy ray curing. Examples of such compounds include (meth)acrylic acid, (meth)acryloyloxyethylsuccinic acid, (meth)acryloyloxyethylhexahydrophthalic acid, (meth)acryloyloxyethylphthalic acid, (2-methacryloyloxy)ethyl dihydrogen phosphate, and bis[2-(methacryloyloxy)ethyl]hydrogen phosphate.

Examples of the alkoxide compound include: alkylalkoxysilanes such as trimethylmethoxysilane, trimethylethoxysilane, and triethylmethoxysilane; and alkoxysilanes such as tetraethoxysilane and tetrapropoxysilane. In addition, examples thereof include tetraethoxytitanium, tetraethoxyzirconium, trimethoxyborane, and triethoxyborane. Of these, tetraethoxysilane and triethoxyborane are preferred because of having favorable handleability.

These reaction inhibitors (C) may be used singly, or in combination of two or more kinds thereof.

The content of the reaction inhibitor (C) in the active energy ray-curable composition is 0.005 parts by mass or more and 10 parts by mass or less, and more preferably 0.01 parts by mass or more and 5 parts by mass or less, when the total content of the active energy ray-curable compound (A) and the thiol compound (B) is 100 parts by mass. When the content is 0.005 parts by mass or more, the effect of adding the reaction inhibitor (C) is sufficiently exhibited. When the content is 10 parts by mass or less, the content is less likely to affect the physical properties of the cured product of the active energy ray-curable composition.

[4] Radical Polymerization Inhibitor (D)

The radical polymerization inhibitor (D) is added to the active energy ray-curable composition of the present embodiment for the purpose of preventing the radical polymerization of the active energy ray-curable compound (A) in storage. When the radical polymerization inhibitor (D) is not added, the storage stability of an enethiol reaction system with high reactivity is not sufficiently obtained.

The kind of the radical polymerization inhibitor (D) is not particularly limited, but examples thereof include: hydroquinones such as hydroquinone, methylhydroquinone, t-butylhydroquinone, hydroquinone monomethyl ether, pyrogallol, methoquinone, 2,5-di-t-butylhydroquinone, p-benzoquinone, catechol, and p-t-butylcatechol; anthraquinone; phenothiazine; 1,4-dimethoxynaphthalene; and 1,4-methoxy-2-methylnaphthalene.

In addition, examples thereof include: nitroso compound such as p-nitrosophenol, nitrosobenzene, N-nitrosodiphenylamine, N-nitrosoarylhydroxyamine or a complex salt thereof, isononyl nitrite, N-nitrosocyclohexylhydroxylamine, N-nitrosophenylhydroxylamine, N,N'-dinitrosophenylenediamine, and salts thereof; nitrone compound such as α-phenyl-N-t-butylnitrone and α-naphthyl-N-t-butylnitrone; and nitroxide compound such as 2,2,6,6-tetramethyl-1-piperidinoxide (TEMPO) and 4-hydroxy-2,2,6,6-tetramethyl-1-piperidinoxide.

Among these radical polymerization inhibitors (D), a compound having a benzene ring and/or a naphthalene ring to which one or more hydroxy groups are bound is preferred, and a compound having a benzene ring and/or a naphthalene ring to which two or more hydroxy groups are bound is more preferred. Examples of the compound having a benzene ring and/or a naphthalene ring to which one or more hydroxy groups are bound include 1,2,3-trihydroxybenzene, propyl-3,4,5-trihydroxybenzene, hydroquinone, methylhydroquinone, 4-methoxy-1-naphthol, 1,4-dihydroxynaphthalene, 4-methoxy-2-methyl-1-naphthol, 4-methoxy-3-methyl-1-naphthol, 1,2-dihydroxynaphthalene, 1,2-dihydroxy-4-methoxynaphthalene, 1,3-dihydroxy-4-methoxynaphthalene, 1,4-dihydroxy-2-methoxynaphthalene, 1,4-dimethoxy-2-naphthol, and 1,4-dihydroxy-2-methylnaphthalene. Of these, 1,2,3-trihydroxybenzene and propyl-3,4,5-trihydroxybenzene are particularly preferred from the viewpoint of availability and handleability.

These radical polymerization inhibitors (D) may be used singly, or in combination of two or more kinds thereof.

The content of the radical polymerization inhibitor (D) in the active energy ray-curable composition is 0.005 parts by mass or more and 5 parts by mass or less, and more preferably 0.01 parts by mass or more and 0.2 parts by mass or less, when the total content of the active energy ray-curable compound (A) and the thiol compound (B) is 100 parts by mass. When the content is 0.005 parts by mass or more, the effect of adding the radical polymerization inhibitor (D) is sufficiently exhibited. When the content is 5 parts by mass or less, the content is less likely to affect the curability of the active energy ray-curable composition.

[5] Water (E)

The content of the water (E) contained in the active energy ray-curable composition of the present embodiment greatly affects the storage stability of the active energy ray-curable composition because water promotes the hydrolysis reaction of an ester bond. In particular, when a polythiol including an ester compound is used as the thiol compound (B) to enhance the storage stability of the active energy ray-curable composition, a mercapto group-containing carboxylic acid is generated by the hydrolysis of the polythiol including the ester compound. The mercapto group-containing carboxylic acid functions as a chain transfer agent to amplify a slight amount of radical generated by heat or an impact, thereby promoting an enethiol reaction. Therefore, the mercapto group-containing carboxylic acid causes the deterioration of the storage stability of the active energy ray-curable composition.

Typically, a Karl Fischer moisture meter is used in the case of measuring the content of water in a compound. However, since the Karl Fischer moisture meter is based on a quantification method using a reaction between iodine and hydrogen, the hydrogen of the mercapto groups of the thiol compound (B) exhibits the same behavior as the behavior of the hydrogen of water, and the Karl Fischer moisture meter is incapable of measuring the correct content of water.

Thus, the water contained in the active energy ray-curable composition is calculated by heating the active energy ray-curable composition to 170° C. and measuring vaporized water with the Karl Fischer moisture meter.

Since the hydrophilic site of the active energy ray-curable composition absorbs moisture, the content of the water (E) in the whole active energy ray-curable composition is 0.05 ppm by mass or more. When the content of the water (E) in the whole active energy ray-curable composition is less than 1% by mass, the storage stability of the active energy ray-curable composition can be allowed to be sufficiently excellent. For example, the storage stability of the active energy ray-curable composition at room temperature can be set to 1 month or more. When the content of the water (E) in the whole active energy ray-curable composition is 1% by mass or more, the storage stability may be deteriorated, and appearance defects such as the turbidity of a cured product are also caused.

When a method of simply heating and drying the active energy ray-curable composition is adopted as a method for adjusting or reducing the content of water in the active energy ray-curable composition, the polymerization and/or addition reaction of the unsaturated ethylenic double bond may proceed at the time of the heating, and therefore, the drying method is unfavorable. Freeze drying is a very excellent drying method in view of precluding the polymerization and/or addition reaction of the unsaturated ethylenic double bond from proceeding. Examples of the drying method with further high productivity include a method in which 10% by mass or more and 90% by mass or less of toluene, xylene, cyclohexane, ethylbenzene, or the like which is a solvent of which the azeotropy with water occurs is added to a raw material component having a high water content among the raw material components of the active energy ray-curable composition, and the resultant is heated to allow the azeotropy of the solvent with water to occur, thereby removing the water in the raw material component in advance.

[6] Active Energy Ray-Curable Composition

A photopolymerization initiator may be added to the active energy ray-curable composition of the present embodiment. The rate of curing the active energy ray-curable composition by irradiation with active energy rays is promoted by adding the photopolymerization initiator.

The kind of the photopolymerization initiator is not particularly limited, and examples thereof include α-hydroxyacetophenones, α-aminoacetophenones, biimidazoles, benzoin methyl ether, benzoin ethyl ether, benzoiniso-propyl ether, benzyl methyl ketal, α-halogenoacetophenones, methylphenyl glyoxylate, benzyl, anthraquinone, phenanthrenequinone, camphorquinone isophthalophenone, and acylphosphine oxide. These photopolymerization initiators may be used singly, or in combination of two or more kinds thereof.

In photo-curing in radical polymerization, the inhibition of polymerization due to oxygen in air usually precludes the complete curing in an interface with air. Commonly, the photo-curing is performed under disposition of an oxygen shielding film such as a cover film to prevent oxygen from coming in contact with a surface, or under an inert gas atmosphere such as an argon gas or nitrogen. However, the active energy ray-curable composition of the present embodiment has sufficient curability regardless of the presence or absence of oxygen, and can be therefore preferably used even in applications in which it is impossible to dispose an oxygen shielding film, or even in applications in which it is desirable not to dispose an oxygen shielding film.

Preferred examples of active energy rays used in photopolymerization include ultraviolet rays, electron rays, and X-rays. Ultraviolet rays are more preferred because an apparatus as a light source is inexpensive.

A light source in the case of curing the active energy ray-curable composition with ultraviolet rays is not particularly limited, and specific examples thereof include black lights, UV-LED lamps, high-pressure mercury lamps, pressurization mercury lamps, metal halide lamps, xenon lamps, and electrodeless discharge lamps. Among these light sources, black lights and LED lamps (UV-LED lamps) are preferred because of being safe and economic.

Here, such a black light refers to a lamp in which special outer tube glass configured to cut the radiation of visible rays and ultraviolet rays having wavelengths of 300 nm or less is covered with a near-ultraviolet light emission fluorescent substance to radiate only near-ultraviolet rays having wavelengths of 300 nm or more and 430 nm or less (a wavelength peak of around 350 nm). Such a UV-LED lamp refers to a lamp in which a light-emitting diode configured to emit ultraviolet rays is used.

The irradiation dose of the active energy ray may be any dose sufficient for curing the active energy ray-curable composition, and may be selected depending on the composition, amount, and thickness of the active energy ray-curable composition, the shape of a formed cured product, and the like. For example, when a thin film of the active energy ray-curable composition (for example, an applied film formed by an application method) is irradiated with ultraviolet rays to cure the thin film, an exposure value can be set to 200 mJ/cm$^2$ or more and 5,000 mJ/cm$^2$ or less, more preferably 1,000 mJ/cm$^2$ or more and 3,000 mJ/cm$^2$ or less.

If desired, various additives may be added to the active energy ray-curable composition of the present embodiment. For example, fluorescent whitening agents, surfactants, plasticizers, flame retardants, antioxidants, ultraviolet absorbents, expanding agents, fungicides, antistatic agents, magnetic substances, conductive materials, antimicrobial/bactericidal materials, porous adsorbents, flavoring agents, pigments, dyes, and the like may be added. These additives may be used singly, or in combination of two or more kinds thereof.

A method for preparing the active energy ray-curable composition of the present embodiment is not particularly limited, but may be a method in which each of the raw materials of the active energy ray-curable composition, including the active energy ray-curable compound (A), the thiol compound (B), the reaction inhibitor (C), and the radical polymerization inhibitor (D), can be mixed and dispersed. Examples of the mixing and dispersion method include each of the following methods.

(a) Each raw material is charged into a container such as a glass beaker, a can, a plastic cup, or an aluminum cup, and kneaded with a stirring rod, a spatula, or the like.

(b) Each raw material is kneaded with a double helical ribbon blade, a gate blade, or the like.

(c) Each raw material is kneaded with a planetary mixer.

(d) Each raw material is kneaded with a bead mill.

(e) Each raw material is kneaded with three rolls.

(f) Each raw material is kneaded with an extruder type kneading extruder.

(g) Each raw material is kneaded with a planetary centrifugal mixer.

An application (coating) method in the case of applying the active energy ray-curable composition of the present embodiment onto, for example, a substrate to form an applied film is not particularly limited. Examples thereof include a spray method and a dipping method, as well as a method using a natural coater, a curtain flow coater, a comma coater, a gravure coater, a microgravure coater, a die coater, a curtain coater, a kiss roll, a squeeze roll, a reverse roll, an air blade, a knife belt coater, a floating knife, a knife-over-roll, a knife-on-blanket, or the like.

The active energy ray-curable composition of the present embodiment is processed into a sheet form and cured to obtain a sheet material including a cured product of the active energy ray-curable composition. The sheet material may contain a component other than the active energy ray-curable composition of the present embodiment, as needed.

The present embodiment is illustrative of an example of the present invention, and the present invention is not limited to the present embodiment. Various changes or modifications can be made to the present embodiment, and an embodiment to which such changes or modifications are made may also be encompassed in the present invention.

EXAMPLES

The present invention will be described in more detail below with reference to Examples and Comparative Examples.

Example 1

An active energy ray-curable compound (A), a thiol compound (B), a reaction inhibitor (C), a radical polymerization inhibitor (D), and a photopolymerization initiator were mixed to prepare an active energy ray-curable composition of Example 1. Detailed explanations will be given with reference to Table 1.

Into an airtight plastic container having a capacity of 150 mL, 75 g of dipentaerythritol hexaacrylate (DPHA manufactured by SARTOMER, a carbon-carbon double bond equivalent of 91 g/eq) as the active energy ray-curable compound (A), 23.2 g of a mixture of pentaerythritol tetrakis(3-mercaptobutylate) and pentaerythritol tris(3-mercaptobutylate) (Karenz MT PE1 manufactured by Showa Denko K.K., a mercapto group equivalent of 139 g/eq) as the thiol compound (B), 1.2 g of methacrylic acid (pKa 4.6) as the reaction inhibitor (C), 0.1 g of propyl-3,4,5-trihydroxybenzene as the radical polymerization inhibitor (D), and 0.5 g of Irgacure (registered trademark) 184 (manufactured by BASF AG) as the photopolymerization initiator were charged, and stirred using a planetary centrifugal mixer, THINKY MIXER ARE-250, manufactured by THINKY CORPORATION, for 3 minutes at a rotational speed of 2,000 rpm in a stirring mode to obtain the active energy ray-curable composition (A-1) of Example 1. The content of water (E) in the active energy ray-curable composition was 650 ppm by mass.

Example 2

An active energy ray-curable composition (A-2) of Example 2 was prepared in a manner similar to that in Example 1, except that 0.03 g of phosphoric acid (pKa 1.8) was used as a reaction inhibitor (C) (see Table 1). The content of water (E) in the active energy ray-curable composition was 1,390 ppm by mass.

Example 3

An active energy ray-curable composition (A-3) of Example 3 was prepared in a manner similar to that in Example 2, except that 23.2 g of ether type primary structure thiol (Capcure (registered trademark) 3-800, manufactured by Toray Industries, Inc., a mercapto group equivalent of 250 g/eq) was used as a thiol compound (B) (see Table 1). The content of water (E) in the active energy ray-curable composition was 1,900 ppm by mass.

Example 4

An active energy ray-curable composition (A-4) of Example 4 was prepared in a manner similar to that in Example 2, except that 23.2 g of pentaerythritol tetrakis(3-mercaptopropionate) (PEMP, manufactured by SC Organic Chemical Co., Ltd., a mercapto group equivalent of 139 g/eq) was used as a thiol compound (B) (see Table 1). The content of water (E) in the active energy ray-curable composition was 1,770 ppm by mass.

Example 5

An active energy ray-curable composition (A-5) of Example 5 was prepared in a manner similar to that in Example 1, except that 0.1 g of 1,2,3-trihydroxybenzene was used as a radical polymerization inhibitor (D) (see Table 1). The content of water (E) in the active energy ray-curable composition was 650 ppm by mass.

Example 6

An active energy ray-curable composition (A-6) of Example 6 was prepared in a manner similar to that in Example 1, except that 1.5 g of triethoxyborane was used as a reaction inhibitor (C) (see Table 1). The content of water (E) in the active energy ray-curable composition was 640 ppm by mass.

Example 7

An active energy ray-curable composition (A-7) of Example 7 was prepared in a manner similar to that in Example 2 except that 25 g of pentaerythritol tri- and tetra-acrylate (ARONIX M-305, manufactured by Toagosei Co., Ltd., a carbon-carbon double bond equivalent of 94 g/eq) and 50 g of trimethylolpropane triacrylate (ARONIX M-309, manufactured by Toagosei Co., Ltd., a carbon-carbon double bond equivalent of 99 g/eq) were used as active energy ray-curable compounds (A) (see Table 1). The content of water (E) in the active energy ray-curable composition was 1,690 ppm by mass.

Example 8

An active energy ray-curable composition (A-8) of Example 8 was prepared in a manner similar to that in Example 4, except that 0.03 g of phosphorous acid (pKa 1.5) was used as a reaction inhibitor (C), and 0.1 g of 1,2,3-trihydroxybenzene was used as a radical polymerization inhibitor (D) (see Table 1). The content of water (E) in the active energy ray-curable composition was 1,800 ppm by mass.

Comparative Example 1

An active energy ray-curable composition (B-1) of Comparative Example 1 was prepared in a manner similar to that in Example 4, except that the reaction inhibitor (C) was not used (see Table 1). The content of water (E) in the active energy ray-curable composition was 640 ppm by mass.

Comparative Example 2

An active energy ray-curable composition (B-2) of Comparative Example 2 was prepared in a manner similar to that in Example 4, except that the radical polymerization inhibitor (D) was not used (see Table 1). The content of water (E) in the active energy ray-curable composition was 650 ppm by mass.

Comparative Example 3

An active energy ray-curable composition (B-3) of Comparative Example 3 was prepared in a manner similar to that in Example 1, except that the thiol compound (B) was not used (see Table 1). The content of water (E) in the active energy ray-curable composition was 460 ppm by mass.

Comparative Example 4

An active energy ray-curable composition (B-4) of Comparative Example 4 was prepared in a manner similar to that in Example 2, except that 1.5 g of water was further added (see Table 1). The content of water (E) in the active energy ray-curable composition was 1.1% by mass.

TABLE 1

| | | | Example 1 | Example 2 | Example 3 | Example 4 | Example 5 | Example 6 |
|---|---|---|---|---|---|---|---|---|
| Blending*) | Energy ray-curable compound (A) | DPHA | 75 | 75 | 75 | 75 | 75 | 75 |
| | | ARONIX M-305 | | | | | | |
| | | ARONIX M-309 | | | | | | |
| | Thiol compound (B) | Karenz MT PE1 3-800 | 23.2 | 23.2 | 23.3 | | 23.2 | 23.2 |
| | | PEMP | | | | 23.3 | | |
| | Reaction inhibitor (C) | Methacrylic acid | 1.2 | | | | 1.2 | |
| | | Phosphoric acid | | 0.03 | 0.03 | 0.03 | | |
| | | Triethoxy borane | | | | | | 1.5 |
| | | Phosphorous acid | | | | | | |
| | Radical polymerization inhibitor (D) | Propyl-3,4,5-trihydroxybenzene | 0.1 | 0.1 | 0.1 | 0.1 | | 0.1 |
| | | 1,2,3-Trihydroxybenzene | | | | | 0.1 | |
| | Photopolymerization initiator | Irgacure 184 | 0.5 | 0.5 | 0.5 | 0.5 | 0.5 | 0.5 |
| | Water (E) | | 650 ppm | 1390 ppm | 1900 ppm | 1770 ppm | 650 ppm | 640 ppm |
| Evaluation | Curability | | A | A | A | A | A | A |
| | Storage stability | | 7 days or more | 7 days or more | 7 days or more | 7 days or more | 7 days or more | 7 days or more |

| | | | Example 7 | Example 8 | Comparative Example 1 | Comparative Example 2 | Comparative Example 3 | Comparative Example 4 |
|---|---|---|---|---|---|---|---|---|
| Blending*) | Energy ray-curable compound (A) | DPHA | | 75 | 75 | 75 | 75 | 75 |
| | | ARONIX M-305 | 25 | | | | | |
| | | ARONIX M-309 | 50 | | | | | |
| | Thiol compound (B) | Karenz MT PE1 3-800 | 23.2 | | | | | 23.2 |
| | | PEMP | | 23.3 | 23.3 | 23.3 | | |
| | Reaction inhibitor (C) | Methacrylic acid | | | | | 1.2 | |
| | | Phosphoric acid | 0.03 | | | | 1.2 | 0.03 |
| | | Triethoxy borane | | | | | | |
| | | Phosphorous acid | | 0.03 | | | | |
| | Radical polymerization inhibitor (D) | Propyl-3,4,5-trihydroxybenzene | 0.1 | | 0.1 | | 0.1 | 0.1 |
| | | 1,2,3-Trihydroxybenzene | | 0.1 | | | | |
| | Photopolymerization initiator | Irgacure 184 | 0.5 | 0.5 | 0.5 | 0.5 | 0.5 | 0.5 |
| | Water (E) | | 1690 ppm | 1800 ppm | 640 ppm | 650 ppm | 460 ppm | 1.1% |

TABLE 1-continued

| Evaluation | Curability | A | A | A | A | C | B |
|---|---|---|---|---|---|---|---|
| | Storage stability | 7 days or more | 7 days or more | 2 days | 1 day | 7 days or more | 3 days |

*)The unit of each blended component is part(s) by mass. However, the unit of water (E) is ppm by mass or % by mass.

The content of water in each of the components described above was measured as described below.

<Method for Measuring Content of Water in Active Energy Ray-Curable Composition>

Measurement was performed using a Karl Fischer moisture meter under the following conditions.

Karl Fischer moisture meter: MKC-610, manufactured by Kyoto Electronics Manufacturing Co., Ltd.

Karl Fischer vaporizer: ADP, manufactured by Kyoto Electronics Manufacturing Co., Ltd.

Karl Fischer reagent (generating solution): AQUAMICRON AX, manufactured by Mitsubishi Chemical Corporation Karl Fischer reagent (counter electrolyte): AQUAMICRON CXU, manufactured by Mitsubishi Chemical Corporation Test charge amount: 0.1±0.04 g
Heating temperature: 170° C.
Nitrogen gas flow rate: 200 mL/min
Measurement time: 10 min Then, the curability and storage stability of the active energy ray-curable compositions of Examples 1 to 8 and Comparative Examples 1 to 4 were evaluated as described below. The results are set forth in Table 1.

<Curability>

The active energy ray-curable composition was applied in a film form to a glass substrate to have a film thickness of 100 μm, and irradiated with ultraviolet rays by using a high-pressure mercury lamp with an illumination level of 100 mW/cm², under air, to achieve an integrated exposure value of 500 mJ/cm², thereby curing the active energy ray-curable composition. The curability was evaluated based on tackiness with the touch. Evaluation criteria are described below. Here, the tackiness means the easiness of the adhesion of a cured product to a finger in the case of touching the cured product with the finger.

(Evaluation Criteria)
A: No tackiness
B: No adhesion of uncured product to finger, with slight tackiness
C: Adhesion of uncured product to finger <Storage Stability>

A sealed storage bottle into which the active energy ray-curable composition had been charged was left standing in a constant-temperature machine at 60° C., and days until the active energy ray-curable composition gelled were measured. The measurement was performed for at most 7 days. When the active energy ray-curable composition did not gel for 7 days, the measurement was stopped. In a method for determining gelation, it was determined that the active energy ray-curable composition gelled in a case in which no flowability was seen even when the storage bottle was inclined, or in a case in which a deposit was visually observed.

As is clear from the results set forth in Table 1, each of the active energy ray-curable compositions of Examples 1 to 8, which contained the active energy ray-curable compound (A), the thiol compound (B), the reaction inhibitor (C), the radical polymerization inhibitor (D), and the water (E), and in which the content of the water (E) was 0.05 ppm by mass or more and less than 1% by mass, exhibited high curability, and exhibited excellent storage stability of 7 days or more even under a storage condition of 60° C.

Comparative Example 1 containing no reaction inhibitor (C) and Comparative Example 2 containing no radical polymerization inhibitor (D) resulted in gelation within 2 days under a storage condition of 60° C. and in poor storage stability although exhibiting high curability. Comparative Example 3 containing no thiol compound (B) resulted in poor curability because of no thiol-ene reaction although exhibiting excellent storage stability. Further, Comparative Example 4 in which water was added to Example 2 excellent in curability and storage stability to achieve a water content of 1% by mass or more resulted in poor storage stability because a cured product had tackiness due to the presence of a large amount of water which was not involved in reaction, and the hydrolysis of polythiol including an ester compound proceeded under a storage condition of 60° C.

The invention claimed is:

1. An active energy ray-curable composition comprising: an active energy ray-curable compound (A) having an unsaturated ethylenic double bond; a thiol compound (B) having two or more mercapto groups in one molecule; a reaction inhibitor (C) configured to inhibit a reaction between the unsaturated ethylenic double bond of the active energy ray-curable compound (A) and the mercapto groups of the thiol compound (B); a radical polymerization inhibitor (D); and water (E), wherein
   a content of the water (E) is 0.05 ppm by mass or more and less than 1% by mass;
   a content of the reaction inhibitor (C) is 0.005 parts by mass or more and 10 parts by mass or less when a total content of the active energy ray-curable compound (A) and the thiol compound (B) is 100 parts by mass;
   a content of the radical polymerization inhibitor (D) is 0.005 parts by mass or more and 5 parts by mass or less when the total content of the active energy ray-curable compound (A) and the thiol compound (B) is 100 parts by mass;
   wherein the thiol compound (B) comprises a compound having two or more mercapto groups in one molecule, all the mercapto groups being bound to a secondary carbon atom or a tertiary carbon atom;
   wherein the thiol compound (B) comprises a compound having a group represented by the following Formula (1), the group being bound to a carbon atom,
   wherein in the following Formula (1), $R^1$ represents an alkyl group having 1 or more and 10 or less carbon atoms, $R^2$ represents a hydrogen atom or an alkyl group having 1 or more and 10 or less carbon atoms, and m represents an integer 0 or more and 2 or less:

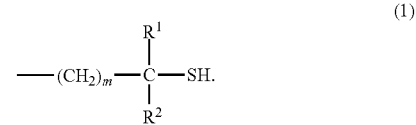

2. The active energy ray-curable composition according to claim 1, wherein the reaction inhibitor (C) comprises a compound having a pKa value of less than 5.

3. The active energy ray-curable composition according to claim 1, wherein the thiol compound (B) comprises at least one selected from 1,4-bis(3-mercaptobutyryloxy)butane, pentaerythritol tetrakis(3-mercaptobutylate), 1,3,5-tris(3-mercaptobutyloxyethyl)-1,3,5-triazine-2,4,6(1H,3H,5H)-trione, and trimethylolpropane tris(3-mercaptobutylate).

4. The active energy ray-curable composition according to claim 1, wherein the reaction inhibitor (C) comprises at least one selected from carboxy group-containing compound, phosphate group-containing compound, phosphoric acid, phosphorous acid, and alkoxide compound.

5. The active energy ray-curable composition according to claim 1, wherein the reaction inhibitor (C) comprises at least one selected from heptanoic acid, (meth)acrylic acid, (meth)acryloyloxyethyl succinic acid, (meth)acryloyloxyethyl hexahydrophthalic acid, (meth)acryloyloxyethyl phthalic acid, (2-methacryloyloxy)ethyl dihydrogen phosphate, bis[2-(methacryloyloxy)ethyl]hydrogen phosphate, triethoxyborane, and tetraethoxysilane.

6. The active energy ray-curable composition according to claim 1, wherein the radical polymerization inhibitor (D) comprises a compound having a benzene ring and/or a naphthalene ring to which one or more hydroxy groups are bound.

7. The active energy ray-curable composition according to claim 1, wherein the radical polymerization inhibitor (D) comprises at least one selected from 1,2,3-trihydroxybenzene and propyl-3,4,5-trihydroxybenzene.

8. A cured product of the active energy ray-curable composition according to claim 1.

9. The active energy ray-curable composition according to claim 2, wherein the thiol compound (B) comprises a compound having a group represented by the following Formula (1), the group being bound to a carbon atom,
wherein in the following Formula (1), R¹ represents an alkyl group having 1 or more and 10 or less carbon atoms, R² represents a hydrogen atom or an alkyl group having 1 or more and 10 or less carbon atoms, and m represents an integer 0 or 1:

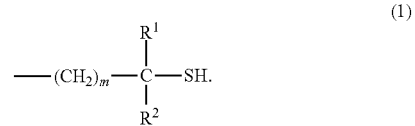

10. The active energy ray-curable composition according to claim 2, wherein the thiol compound (B) comprises at least one selected from 1,4-bis(3-mercaptobutyryloxy)butane, pentaerythritol tetrakis(3-mercaptobutylate), 1,3,5-tris(3-mercaptobutyloxyethyl)-1,3,5-triazine-2,4,6(1H,3H,5H)-trione, and trimethylolpropane tris(3-mercaptobutylate).

11. The active energy ray-curable composition according to claim 2, wherein the reaction inhibitor (C) comprises at least one selected from carboxy group-containing compound, phosphate group-containing compound, phosphoric acid, phosphorous acid, and alkoxide compound.

12. The active energy ray-curable composition according to claim 6, wherein the reaction inhibitor (C) comprises at least one selected from carboxy group-containing compound, phosphate group-containing compound, phosphoric acid, phosphorous acid, and alkoxide compound.

13. The active energy ray-curable composition according to claim 3, wherein the reaction inhibitor (C) comprises at least one selected from carboxy group-containing compound, phosphate group-containing compound, phosphoric acid, phosphorous acid, and alkoxide compound.

14. The active energy ray-curable composition according to claim 2, wherein the reaction inhibitor (C) comprises at least one selected from heptanoic acid, (meth)acrylic acid, (meth)acryloyloxyethyl succinic acid, (meth)acryloyloxyethyl hexahydrophthalic acid, (meth)acryloyloxyethyl phthalic acid, (2-methacryloyloxy)ethyl dihydrogen phosphate, bis[2-(methacryloyloxy)ethyl]hydrogen phosphate, triethoxyborane, and tetraethoxysilane.

* * * * *